(12) United States Patent
Tamura et al.

(10) Patent No.: US 8,740,477 B2
(45) Date of Patent: Jun. 3, 2014

(54) HYBRID CONNECTOR

(75) Inventors: Naoyoshi Tamura, Yamato (JP);
Akihiro Shimotsu, Ebina (JP)

(73) Assignee: Molex Incorporated, Lisle, IL (US)

( * ) Notice: Subject to any disclaimer, the term of this patent is extended or adjusted under 35 U.S.C. 154(b) by 95 days.

(21) Appl. No.: 13/386,869

(22) PCT Filed: Jul. 27, 2010

(86) PCT No.: PCT/US2010/043346
§ 371 (c)(1),
(2), (4) Date: Jan. 24, 2012

(87) PCT Pub. No.: WO2011/014491
PCT Pub. Date: Feb. 3, 2011

(65) Prior Publication Data
US 2012/0121223 A1    May 17, 2012

(30) Foreign Application Priority Data

Jul. 27, 2009 (JP) ................ 2009-173790

(51) Int. Cl.
| | |
|---|---|
| *G02B 6/36* | (2006.01) |
| *G02B 6/42* | (2006.01) |
| *G02B 6/38* | (2006.01) |
| *G02B 6/00* | (2006.01) |

(52) U.S. Cl.
CPC ............... *G02B 6/36* (2013.01); *G02B 6/4292* (2013.01); *G02B 6/3897* (2013.01)
USPC .................. 385/92; 385/53; 385/65; 385/75; 385/88; 385/139

(58) Field of Classification Search
CPC ....... G02B 6/36; G02B 6/4292; G02B 6/3897
USPC ........... 385/52, 53, 65, 70, 75–78, 83, 88, 89, 385/92–94, 139
See application file for complete search history.

(56) References Cited

U.S. PATENT DOCUMENTS

| 5,745,622 A | 4/1998 | Birnbaum et al. |
|---|---|---|
| 6,547,446 B2 | 4/2003 | Yamaguchi |
| 2011/0091163 A1 * | 4/2011 | Shimotsu et al. ............... 385/76 |

FOREIGN PATENT DOCUMENTS

| EP | 1 211 537 A2 | 6/2002 |
|---|---|---|
| WO | WO 2009/045366 A1 | 4/2009 |

OTHER PUBLICATIONS

International Search Report for PCT/US2010/043346, (Aug. 16, 2010).

* cited by examiner

*Primary Examiner* — Kaveh Kianni
*Assistant Examiner* — Hung Lam
(74) *Attorney, Agent, or Firm* — Timothy M. Morella

(57) ABSTRACT

A hybrid connector is disclosed. The hybrid connector comprises a cable, a plug and a connector housing. The cable has an optical waveguide and conductive wires disposed therein. The plug is connected to the cable. The connector housing is configured to mount on the plug. The connector housing is provided with a connector-side locking portion, an optical connection portion and an electrical connection portion.

20 Claims, 8 Drawing Sheets

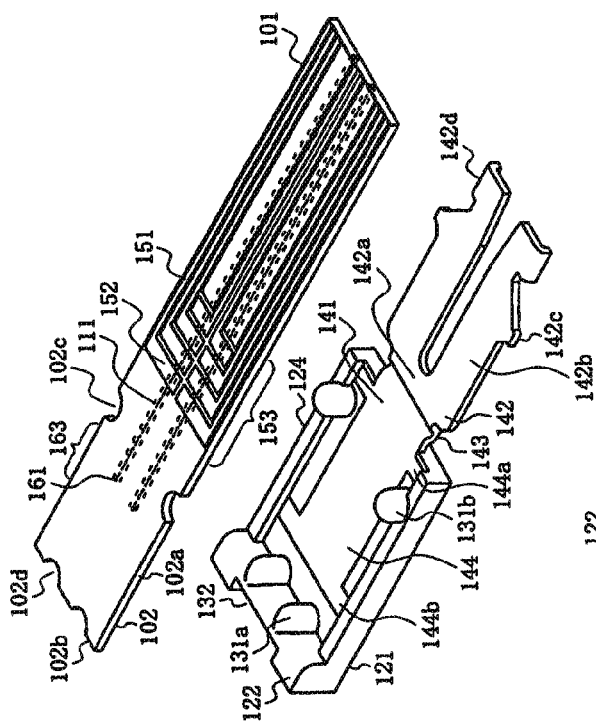
FIG. 2A
FIG. 2B
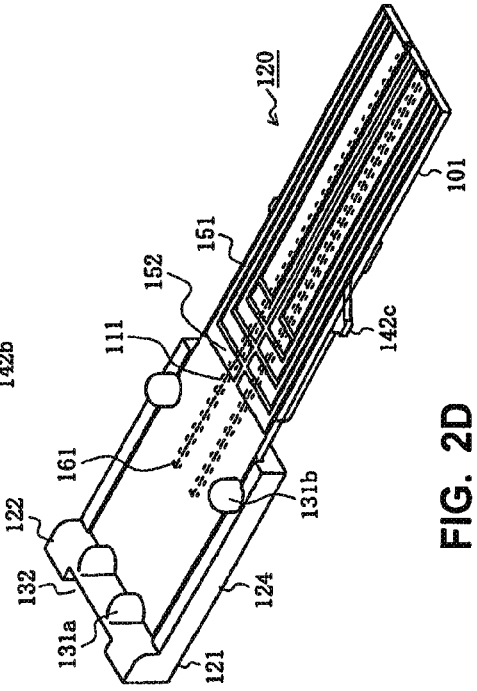
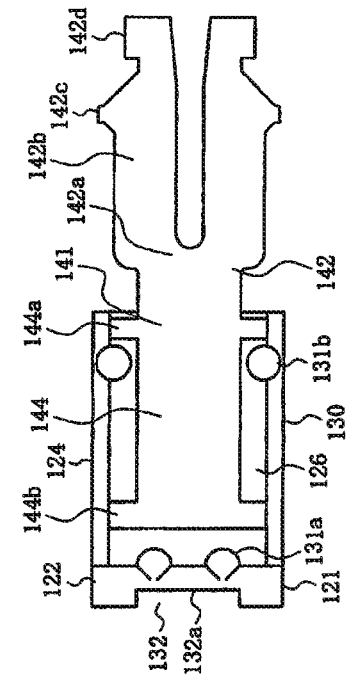
FIG. 2C
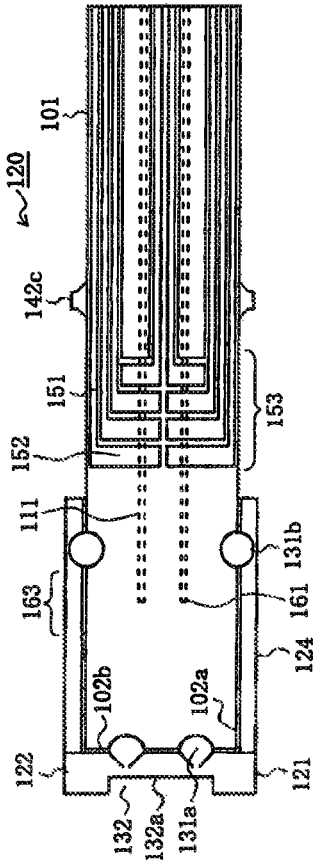
FIG. 2D

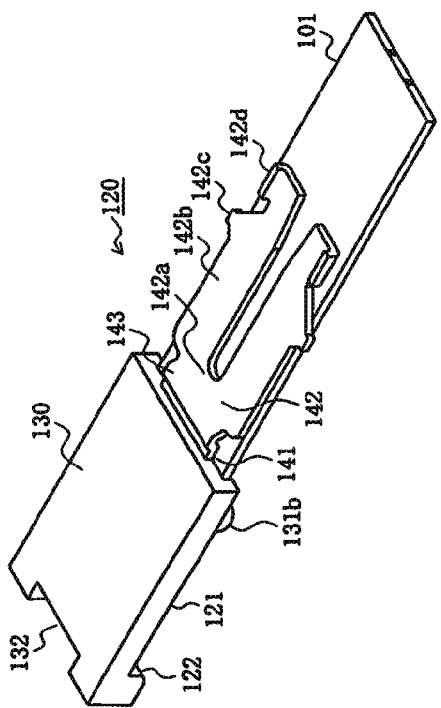
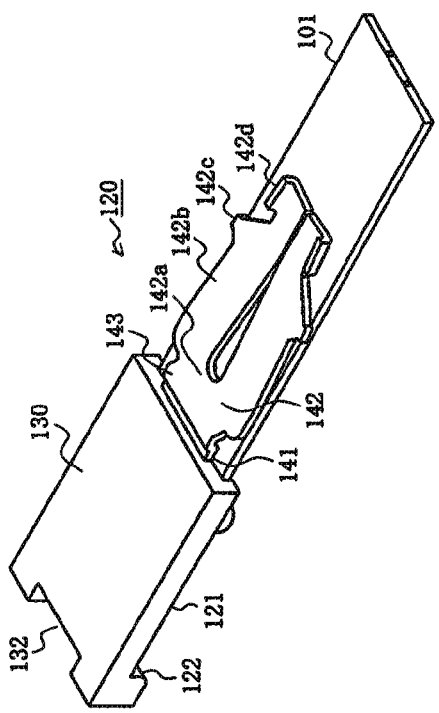
FIG. 3A
FIG. 3C
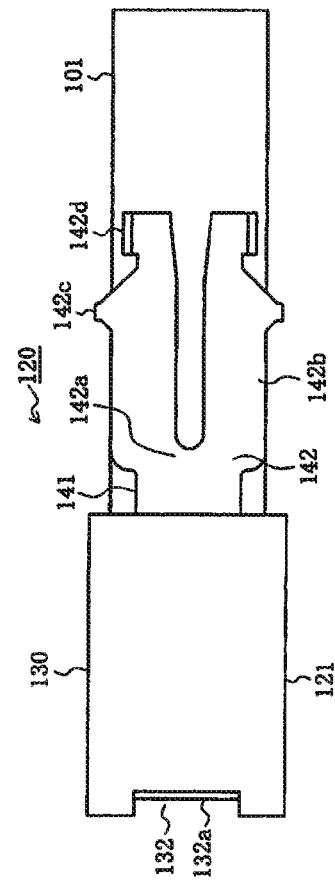
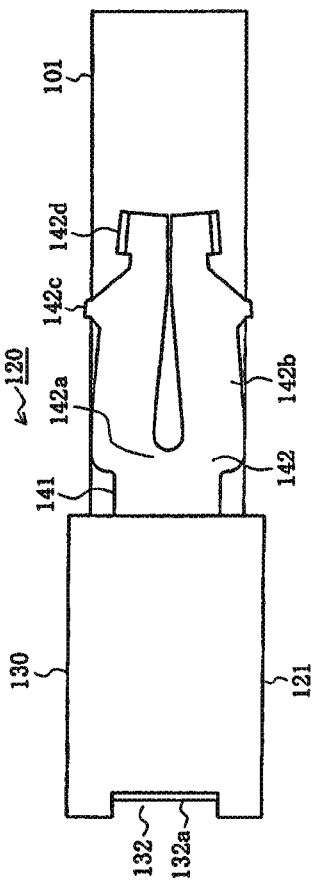
FIG. 3B
FIG. 3D

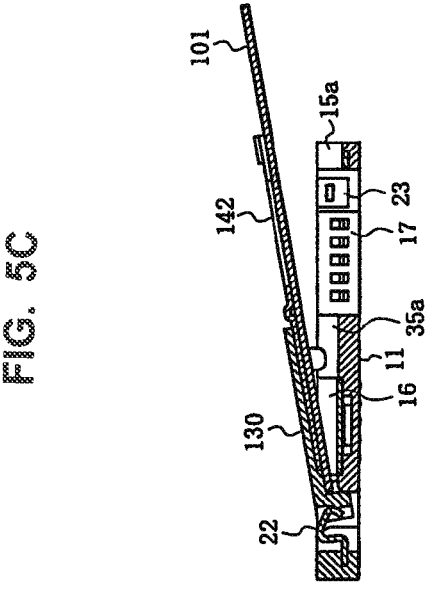
FIG. 5A
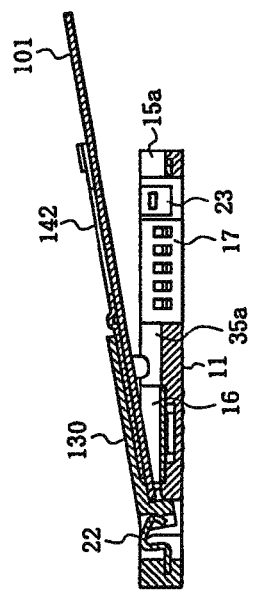
FIG. 5B
FIG. 5C
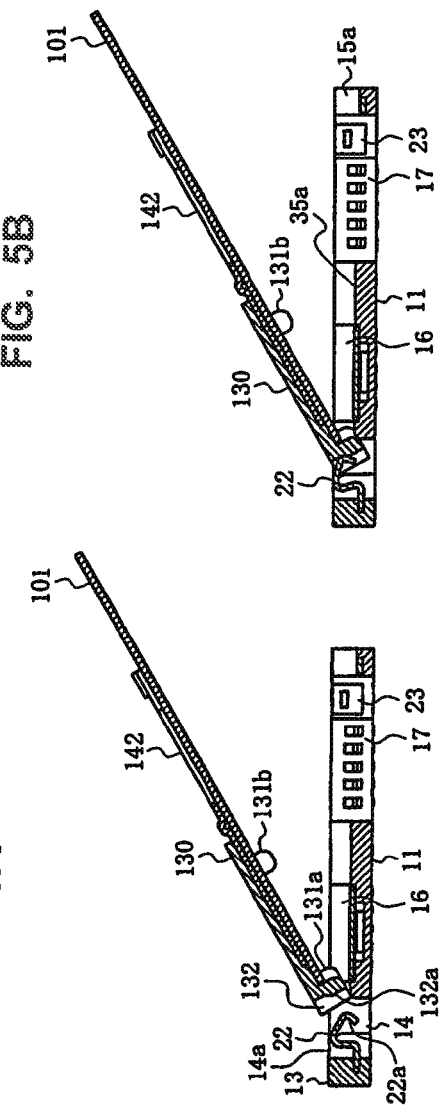
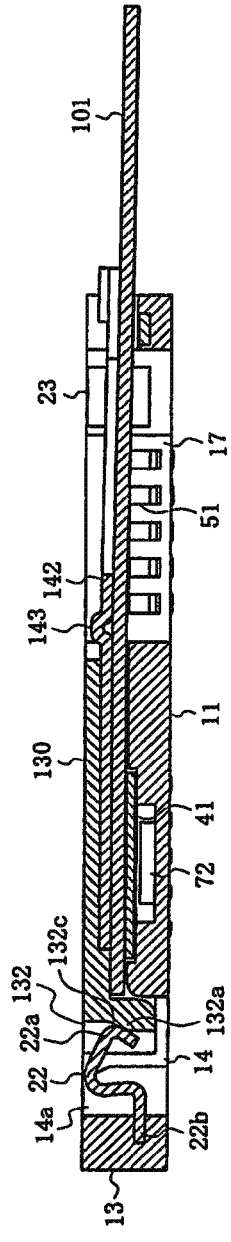
FIG. 5D

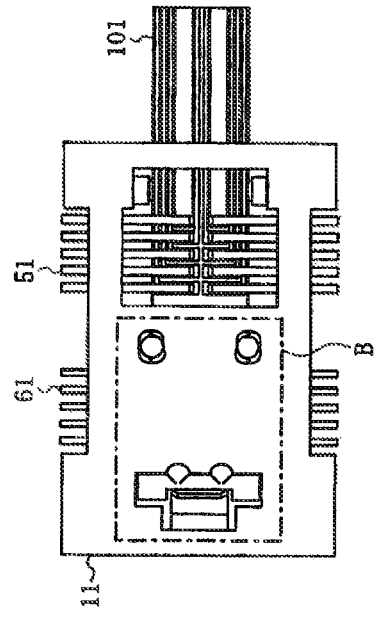
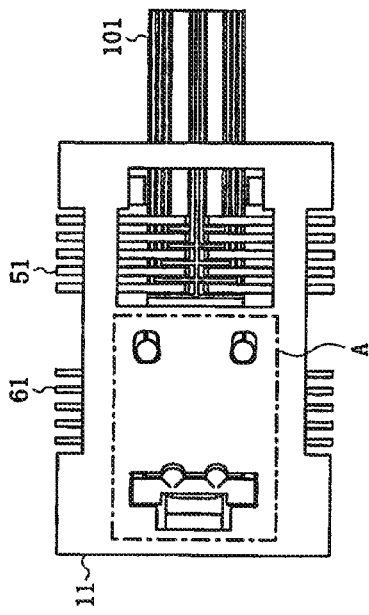
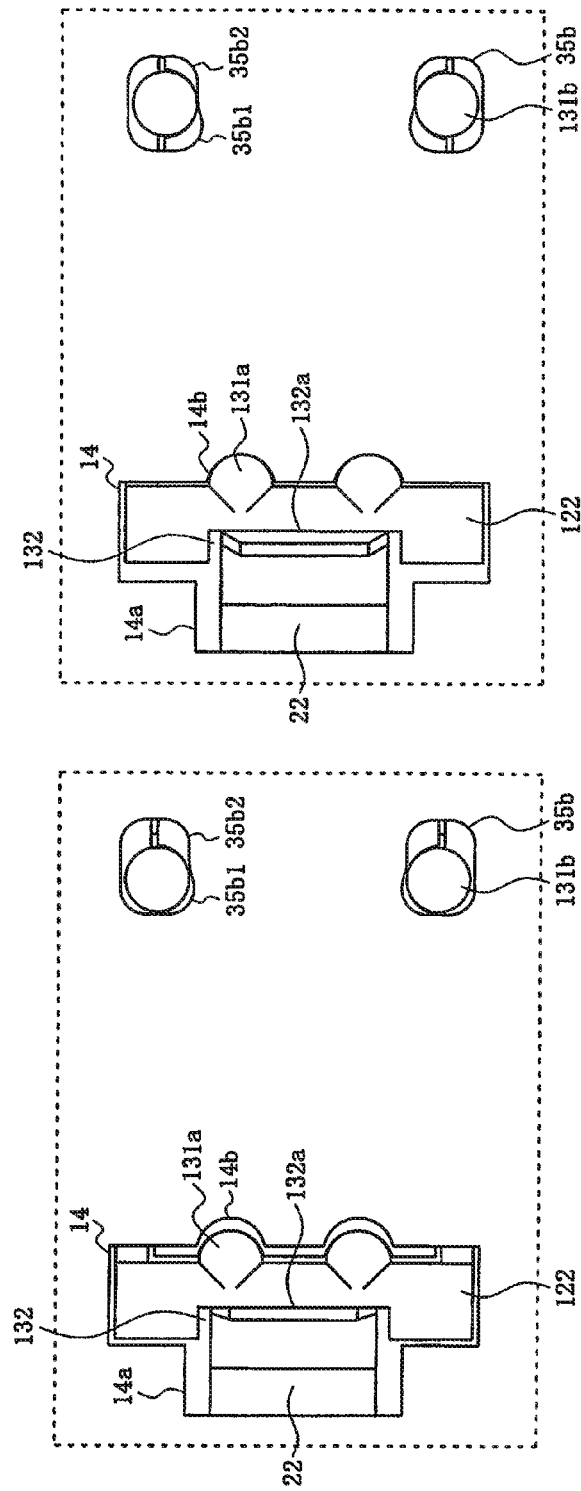

HYBRID CONNECTOR

REFERENCE TO RELATED APPLICATIONS

The Present Application claims priority to prior-filed Japanese Patent Application No. 2009-173790, entitled "Hybrid Connector," and filed 27 Jul. 2009, the contents of which is fully incorporated in its entirety herein.

BACKGROUND OF THE PRESENT APPLICATION

The Present Application relates generally to a hybrid connector, and more particularly, to a connector having a rigid optical connection area and a flexible electrical connection area.

In a conventional electronic device, such as a personal computer, a cellular telephone, a personal digital assistant (PDA), a digital or video camera, a music player, a game machine or a car navigation device, in order to realize both a decrease in the overall size of the casing and an increase in the size of the display screen, the casing may be preferably configured to be collapsible. In such a case, a flexible printed circuit (FPC) and conductive wires such as a fine coaxial cable may be arranged to pass through the inside of a hinge portion, allowing a casing to be pivotably connected with another so that signals can be parallely transmitted.

Although an increased signal transmission speed is necessary to increase image resolution, there is a limit to increasing the inside dimension of the hinge portion. Thus, it is impractical to arrange a conductive wire having a large width and/or diameter. In addition, to protect against electromagnetic interference (EMI), the conductive wire must become larger in width and/or diameter. In this regard, a method of optical transmission is preferred, capable of transmitting a large amount of signals and providing an excellent EMI countermeasure. An example is illustrated and described in Japanese Patent Application No. 2008-275717.

Another example is illustrated in FIG. 8. In FIG. 8, an opto-electrical hybrid board 801 includes a plurality of electrical terminals 851 arranged on a surface thereof, and an optical semiconductor device 872 (e.g., a light receiving element or a light emitting element). A plug of an opto-electrical hybrid connector 920, connected to the board 801, includes a plug housing 930 connected to an optical fiber 901 and an electrical wire 951. An optical path conversion portion is mounted to the plug housing 930, and is connected to an extreme end of a core portion 911 of the optical fiber 901 so as to change a direction of light transmitted thereto to about a right angle, and a connector terminal 952 which is connected to an extreme end of the electrical wire 951.

When the board 801 is connected to the plug 920, a lower end of the connector terminal 952 is brought into tight contact with an upper face of the electrical terminal 851. At the same time, a lower surface of the optical path conversion portion 961 opposes the optical semiconductor device 872. Thus, the electrical wire 951 is connected to the electrical terminal 851 and transmits/receives signals to/from the electrical terminal 851, and the core portion 911 of the optical fiber 901 transmits/receives optical signals to/from the semiconductor device 872.

However, since the conventional connector is not provided with any special mechanism for achieving a positioning of the plug 920 and the board 801, it is difficult to perform a connecting operation. Usually, when the core portion 911 is optically connected to the optical semiconductor device 872, regardless of the presence of the optical path conversion portion 961, the positioning of the optical paths of the core portion 911 and the optical semiconductor device 872 require a high degree of precision. For this reason, connecting the plug 920 and the board 801 together without an appropriate mechanism for achieving positioning is extremely difficult.

SUMMARY OF THE PRESENT APPLICATION

Therefore, it is an object of the Present Application to obviate the above-described problems encountered by the conventional hybrid connector, and to provide a hybrid connector having a configuration wherein a connector-side locking portion of a connector housing is engaged with a plug-side locking portion of a plug housing, to achieve a positioning of a plug relative to the connector housing; and wherein a plug-side optical connection portion has a higher rigidity than a plug-side electrical connection portion. As a result, errors of a lock mechanism may be absorbed. Therefore, it is possible to achieve the positioning of the plug relative to the connector housing in an accurate and easy manner and to simplify the structure of the lock mechanism. Accordingly, the hybrid connector can be produced to have a small size and a simple structure at a low cost with high durability and good operability.

Therefore, a hybrid connector according to the Present Application includes a cable having formed therein an optical waveguide and conductive wires; a plug having the cable connected thereto; and a connector housing configured to mount thereon the plug, wherein: the connector housing is provided with a connector-side locking portion, an optical connection portion, and an electrical connection portion; the plug is provided with a plug-side locking portion, a plug-side optical connection portion, and a plug-side electrical connection portion, the plug-side optical connection portion having a higher rigidity than the plug-side electrical connection portion; and, when the plug-side locking portion is engaged with the connector-side locking portion so that the plug is mounted on the connector housing, the plug-side optical connection portion and the plug-side electrical connection portion oppose the optical connection portion and the electrical connection portion, respectively.

The hybrid connector according to another embodiment of the Present Application has a configuration such that the connector-side locking portion includes a first connector-side locking portion, which is arranged close to the optical connection portion, and a second connector-side locking portion, which is arranged close to the electrical connection portion; the plug-side locking portion includes a first plug-side locking portion, which is arranged close to the plug-side optical connection portion, and a second plug-side locking portion, which is arranged close to the plug-side electrical connection portion; and, when the first connector-side locking portion and the first plug-side locking portion are engaged together, and the second connector-side locking portion and the second plug-side locking portion are engaged together, the connector housing and the plug are locked.

The hybrid connector according to a further embodiment of the Present Application has a configuration in which the plug is provided with a plug housing which has formed therein the first plug-side locking portion, and a locking plate capable of being elastically deformed and attached to the plug housing and which has formed therein the second plug-side locking portion; the plug-side optical connection portion is included in a portion of the cable, which is fixed in a state of being positioned relative to the plug housing; and, the plug-side electrical connection portion is included in a portion of the cable, which opposes the locking plate.

The hybrid connector according to a still further embodiment of the Present Application has a configuration such that the first connector-side locking portion is configured to press the first plug-side locking portion in a direction towards a bottom surface of the connector housing; and, the second connector-side locking portion is configured to hold the second plug-side locking portion in a direction perpendicular to the bottom surface of the connector housing.

The hybrid connector according to a still further embodiment of the Present Application has a configuration such that the position at which the second connector-side locking portion and the second plug-side locking portion are engaged together is located closer to the bottom surface of the connector housing than the position of an upper surface of the optical connection portion.

The hybrid connector according to a still further embodiment of the Present Application has a configuration such that the cable is provided with a cable-side guide portion; the plug housing is provided with a plug-side guide portion; the connector housing is provided with a connector-side guide portion; and, the plug-side guide portion is engaged with the cable-side guide portion to achieve a positioning of the cable and the plug housing and be engaged with the connector-side guide portion to achieve a positioning of the connector housing and the plug.

The hybrid connector according to a still further embodiment of the Present Application has a configuration such that two or more plug-side locking portions are provided so that at least one is formed on each of a front end and a rear end of the plug housing; and, two or more connector-side locking portions are provided so that at least one is formed on each of a front end and a rear end of the connector housing.

In accordance with the Present Application, the hybrid connector has a configuration in which the connector-side locking portion of the connector housing is engaged with the plug-side locking portion of the plug housing to achieve the positioning of the plug relative to the connector housing, and the plug-side optical connection portion has a higher rigidity than the plug-side electrical connection portion. Due to such a configuration, errors of the lock mechanism are absorbed. Therefore, it is possible to achieve the positioning of the plug relative to the connector housing in an accurate and easy manner and to simplify the structure of the lock mechanism. Accordingly, it is possible to provide a hybrid connector which can be produced to have a small size and a simple structure at a low cost with high durability and good operability.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which:

FIGS. 2A to 2D are views illustrating a lower surface of the plug of the hybrid connector of FIG. 1, in which FIG. 2A is a bottom plan view illustrating a state where the cable is maintained at its position prior to being attached, FIG. 2B is an exploded view, FIG. 2C is a bottom plan view, and FIG. 2D is an oblique bottom perspective view;

FIGS. 3A to 3D are views illustrating an upper surface of the plug of FIG. 2, in which FIG. 3A is a top plan view, FIG. 3B is an oblique top perspective view, FIGS. 3C-D are top plan and oblique top perspective views, respectively, illustrating a state where a locking plate is deformed;

FIGS. 4A to 4D are perspective views illustrating an operation of tightly fitting the plug to be engaged with a receptacle connector, in which FIGS. 4A to 4D are perspective views illustrating a series of operations thereof;

FIGS. 5A to 5D are side sectional views illustrating an operation of tightly fitting the plug with a receptacle connector, in which FIGS. 5A to 5D are side sectional views illustrating a series of operations thereof;

FIGS. 6A to 6D are bottom plan views of the receptacle connector engaged, by fitting, with the plug of FIG. 2, in which FIG. 6A illustrates a state where positioning is not yet achieved, FIG. 6B illustrates a state where positioning is achieved, FIG. 6C is an enlarged view of "A" portion in FIG. 6A, and FIG. 6D is an enlarged view of "B" portion in FIG. 6B;

DESCRIPTION OF THE PREFERRED EMBODIMENTS

While the Present Application may be susceptible to embodiment in different forms, there is shown in the Figures, and will be described herein in detail, specific embodiments, with the understanding that the disclosure is to be considered an exemplification of the principles of the Present Application, and is not intended to limit the Present Application to that as illustrated.

In the illustrated embodiments, directional representations—i.e., up, down, left, right, front, rear and the like, used for explaining the structure and movement of the various elements of the Present Application, are relative. These representations are appropriate when the elements are in the position shown in the Figures. If the description of the position of the elements changes, however, it is assumed that these representations are to be changed accordingly.

Figure 1:
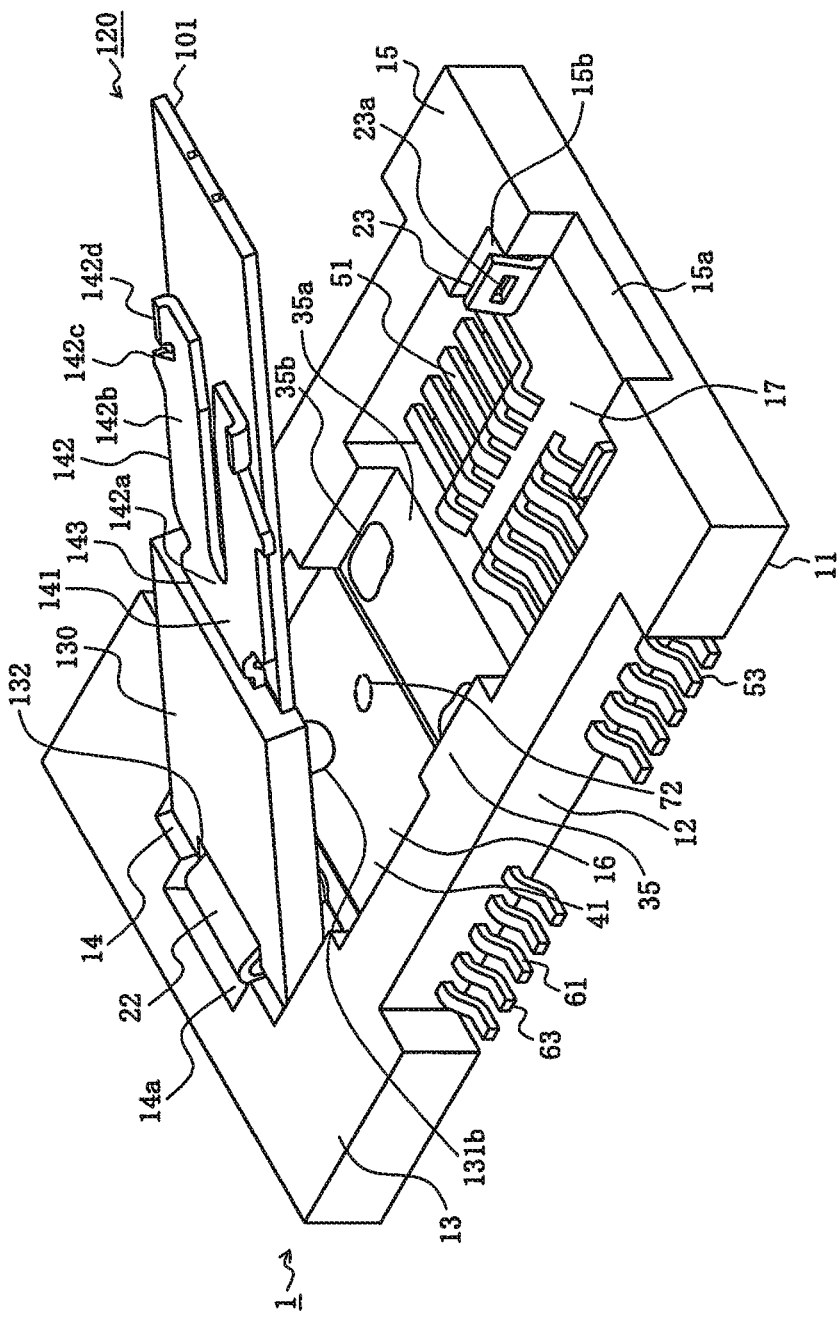
FIG. 1 is a perspective view of a hybrid connector according to an embodiment of the Present Application, illustrating a state where a cable is being connected to the hybrid connector.

In FIG. 1, a receptacle connector 1, as one of a pair of hybrid connectors, is a board-side connector mounted on a non-illustrated board (e.g., a circuit board) and constitutes a part of an optical connector for establishing a connection to a cable 101. In the Present Application, the cable 101 is a hybrid cable having integrated therewith an optical waveguide and conductive wires 151. Specifically, the cable 101 may be one in which a flexible flat plate-like cable is laminated onto one surface of a strip-like optical waveguide to form an integrated body, and/or one in which a conductive pattern is formed on one surface of a strip-like optical waveguide. In addition, a plug housing 130 is attached to an end portion of the cable 101, and a plug 120, which is a counterpart hybrid connector, is formed in the end portion. Moreover, the plug 120 engages the receptacle connector 1, whereby the cable 101 is connected to the receptacle connector 1.

Although the purpose of the cable 101 is not limited, it may be used in a personal computer, a cellular phone, a PDA, a digital camera, a video camera, a music player, a game machine or a car navigation device. Specifically, it may be useful in an electronic device in which a casing is divided into a plurality of parts, and neighboring parts are rotatably connected with each other, so that the cable is wired to pass through an inside of a hinge portion that rotatably connects the neighboring division parts. Moreover, the cable 101 should be capable of transmitting signals through serial transmission via the optical waveguide, for example, is an excellent EMI countermeasure, and is thus suitably used for high-speed transmission of a large amount of signals. Furthermore, the receptacle connector 1 should be suitably mounted on a surface of a board arranged within a casing of the electronic device or apparatus.

The receptacle connector 1 is provided with a connector housing 11, integrally formed of an insulating material, and a first connector-side locking portion 22 and a second connector-side locking portion 23, which are integrally formed of an elastically deformable material and attached to the connector housing 11. The first connector-side locking portion 22 and the second connector-side locking portion 23 constitute a part of a locking mechanism for locking the plug 120 and the connector housing 11.

The connector housing 11 is a plate-like member having a generally rectangular shape. The connector housing 11 is provided with a pair of side wall portions 12 extending in the longitudinal direction thereof, a front-end wall portion 13 extending in the width direction in a front end thereof so as to connect the side wall portions 12 at both sides thereof, a rear-end wall portion 15 extending in the width direction in a rear end thereof so as to connect the side wall portions 12 at both sides thereof, and a partition wall portion 35 extending in the width direction between the front-end wall portion 13 and the rear-end wall portion 15 so as to connect the side wall portions 12 at both sides thereof. The side wall portions 12, the front-end wall portion 13, the rear-end wall portion 15 and the partition wall portion 35 have upper surfaces which are substantially even with each other. The connector housing 11 is further provided with an optical connection portion 16 and an electrical connection portion 17 arranged in tandem in the longitudinal direction from a front end toward a rear end. The optical connection portion 16 and the electrical connection portion 17 are concave and are downwardly depressed from the upper surfaces of the side wall portions 12, the front-end wall portion 13, the rear-end wall portion 15 and the partition wall portion 35, and are partitioned by the partition wall portion 35.

The front-end wall portion 13 has a concave front guide portion 14 formed therein, and the first connector-side locking portion 22 is arranged in a front lock accommodation-concave portion 14a of the concave front guide portion 14. A base end 22b of the first connector-side locking portion 22 is attached to the front-end wall portion 13 such that the base end 22b is embedded in the front-end wall portion 13 by a manufacturing method (e.g., over-molding).

The concave front guide portion 14 is configured to guide a front crossbar portion 122 formed in the front end of the plug 120 therein, and is provided with a first concave positioning portion 14b. The first concave positioning portion 14b engages a first convex positioning portion 131a formed in the front crossbar portion 122 of the plug 120, thereby achieving a positioning of the connector housing 11 relative to the plug 120 with high precision.

The rear-end wall portion 15 is provided with a cable accommodation-concave portion 15a that accommodates a portion of the cable 101, and a rear lock accommodation-concave portion 15b formed adjacent to the front side of the cable accommodation-concave portion 15a. The rear lock accommodation-concave portion 15b has a width slightly larger than that of the cable accommodation-concave portion 15a, and a second connector-side locking portion 23 which constitutes a part of the lock mechanism for locking the plug 120 and the connector housing 11 and is attached to each of a pair of opposite inner side surfaces thereof. The second connector-side locking portions 23 have an approximate L-shape and have flat base ends which are attached to the rear-end wall portion 15 such that they are embedded in the rear-end wall portion 15 by a manufacturing method (e.g., over-molding). A concave locking portion 23a, formed in the portion erected from each of the base ends, is configured to be engaged with a convex locking portion 142c of a locking plate 141 of the plug 120. The opposing surfaces of the left and right second connector-side locking portions 23, having formed therein the concave locking portions 23a, are preferably tapered so that the distance between the upper ends thereof is larger than the distance between the lower ends thereof.

The partition wall portion 35 is provided with a concave rear guide portion 35a that is configured to accommodate therein a portion of the plug housing 130 and a second concave positioning portion 35b that is opened to the bottom surface of the concave rear guide portion 35a. The second concave positioning portion 35b is configured to be engaged with a second convex positioning portion 131b that is formed in the plug 120, thereby achieving a positioning of the plug 120 relative to the connector housing 11 with high precision.

The plug housing 130 of the plug 120 is an approximately rectangular plate-like member, and a concave plug front end portion 132 configured to be engaged with the first connector-side locking portion 22 is formed at a front end thereof. The concave plug front end portion 132 constitutes a part of the lock mechanism for locking the plug 120 and the connector housing 11 and is provided with a later-described first plug-side locking portion 132a which is configured as a convex portion. The plug housing 130 is attached to a locking plate 141 that includes a second plug-side locking portion. The locking plate 141 is a member that is integrally formed of an elastically deformable material such as metal or synthetic resin and is attached to the connector housing 11, and is provided with a later-described base portion 144 that is attached to the plug housing 130 and an actuation portion 142 that is connected to the base portion 144 so as to rearwardly extend from the rear end of the plug housing 130.

The actuation portion 142 is connected to the base portion 144 via a curved portion 143 protruding upwardly from the base portion 144 and is configured to be inclined relative to the base portion 144 when seen from a lateral direction. The inclination angle of the actuation portion 142 relative to the base portion 144 can be changed by adjusting the shape of the curved portion 143. Since the whole body of the locking plate 141 is formed of an elastically deformable material, the downward pressing force of the actuation portion 142 against the cable 101 can be adjusted by changing the inclination angle.

The actuation portion 142 is a member generally having a bifurcated fork-like or tuning fork-like shape from a top plan view thereof. The actuation portion 142 is provided with an actuator body portion 142a that is connected to the curved portion 143, a pair of actuator arms 142b that are extended rearwardly from the actuator body portion 142a, a manipulation portion 142d that is formed at the rear end of each of the actuator arms 142b, and a convex locking portion 142c as the second plug-side locking portion, which is formed at the front side of the manipulation portion 142d and constitutes a part of the lock mechanism for locking the plug 120 and the connector housing 11. The manipulation portions 142d are convex portions that are formed to protrude upwardly, and are configured to deform elastically the left and right actuator arms 142b when the left and right manipulation portions 142d are squeezed by an operator's fingers, thereby narrowing the gap between the actuator arms 142b. The convex locking portions 142c are convex portions that protrude laterally outward from the left and right side surfaces of the actuation portion 142, and are configured to protrude more than the side surfaces of the cable 101 in a non-operating state of the manipulation portions 142d and be engaged with the concave locking portions 23a of the second connector-side locking portions 23.

Moreover, the plug 120 is thin, plate-like and has a rectangular shape from a top plan view thereof, and is configured such that when the plug 120 is mounted on the connector housing 11, the plug 120 is accommodated in the concave front guide portion 14, the optical connection portion 16, the concave rear guide portion 35a, the electrical connection portion 17, and the cable accommodation-concave portion 15a and positioned to be substantially even with the upper surfaces of the side wall portions 12, the front-end wall portion 13, the rear-end wall portion 15, and the partition wall portion 35. Due to such a configuration, the height of the hybrid connector will not increase even if the plug 120 and the receptacle connector 1 are engaged.

The optical connection portion 16 is a portion that transmits/receives light to/from an optical waveguide of the cable 101 and is configured as a concave portion capable of receiving therein an optical device such as a non-illustrated control IC or the like as a light receiving/emitting control device that is provided with a control circuit for controlling an optical semiconductor device 72 such as a light receiving element or a light emitting element 72. In the example illustrated in the drawing figures, the optical connection portion 16 has a configuration such that an upper surface of the concave portion is at least partially sealed by a thin plate-like sealing plate 41 that is formed of a translucent material such as glass.

The optical connection portion 16 is configured to receive therein optical terminals 61 that are formed of a conductive material such as metal and connected to the optical semiconductor device 72 or the control IC. The optical terminals 61 are provided with tail portions 63 as a board connection portion connected, by soldering or the like, to connection pads formed on a surface of a board so that the tail portions 63 protrude outward from the side surfaces of the connector housing 11.

The electrical connection portion 17 is a portion that is electrically connected to the conductive wires 151 of the cable 101 and is configured as a concave portion capable of receiving therein electrical connection terminals 51 formed of a conductive material such as metal. The electrical connection terminals 51 are provided with contact portions that are formed in the vicinity of free ends thereof and are curved so as to be convex toward the upper side and tail portions 53 as a board connection portion connected, by soldering or the like, to connection pads formed on a surface of a board, so that the tail portions 53 are projected outward from the side surfaces of the connector housing 11.

Although the cable 101 is a thin-plate member having an elongated strip shape, only a portion in the vicinity of a front end thereof (the upper left end in FIG. 2B) is illustrated in FIGS. 2-3. Moreover, a connection end portion as a plug connection portion 102 is formed within a range of a predetermined length from a front end surface 102b thereof.

On the lower surface of the cable 101, a plurality of lines, e.g., six lines of foil-like conductive wires 151 formed of a conductive material such as metal is arranged in parallel with one another at a predetermined pitch on a non-illustrated insulating layer of the cable 101. Furthermore, the insulating layer is removed in the connection end portion 102 so that the lower surface of the conductive wires 151 is exposed.

In addition, connection pad portions 152 having a large width are formed at distal ends of the respective conductive wires 151. The respective connection pad portions 152 are formed at positions corresponding to the contact portions of the electric connection terminals 51 received in the electric connection portion 17 of the connector housing 11 in a state where the cable 101 is connected to the receptacle connector 1. Moreover, a portion within the range, where the connection pad portions 152 are arranged, functions as a plug-side electric connection portion 153. Although the connection pad portions 152 may be arranged in an arbitrary form, it is preferable that they are arranged in parallel, and arranged in tandem in an axial direction of the cable 101, as illustrated in the drawing figures. Owing to this configuration, it is possible to arrange a number of connection pad portions 152 without needing to increase the width of the connection end portion 102, and as a result, it is possible to suppress any increase in the width dimension of the plug 120. When the conductive wires 151 have a sufficiently large width, it is not necessary to form large-width connection pad portions 152, but it is possible to allow distal ends of the conductive wires 151 to function per se as the connection pad portions 152.

In the present embodiment, the cable 101 has an optical waveguide laminated on the conductive wires 151. The optical waveguide is provided with a core portion 111 serving as a light transmission path which extends in the axial direction of the cable 101 to transmit light therethrough and a plate-shaped clad portion which is configured to surround the core portion 111. In the example illustrated in the drawing figure, although the number of core portions 111 is two, the number may be one or may be three or more and may be set arbitrarily.

Moreover, although a transmission mode of the optical waveguide may be any one of a single mode and a multi mode, in this example, it will be described as being a single mode. Furthermore, a refractive index of the clad portion is preferably set to a value lower than a refractive index of the core portion 111. Furthermore, the core portion 111 and the clad portion may be formed of any kinds of materials as long as they can satisfy the above-mentioned refractive index requirements. For example, the core portion 111 and the clad portion may be formed of a silicon board, a glass board, or a flexible resin film. In this specification, a description of an example where the core portion 111 and the clad portion are formed of a flexible resin film will be provided.

The conductive wires 151 are conductive wires of a flexible circuit board, which is called FPC, for example, and are arranged on the lower surface (the upper surface in FIG. 2) of the optical waveguide in parallel with one another at a predetermined pitch so as to extend in the axial direction of the cable 101. Moreover, in the connection end portion 102, a plug-side optical connection portion 163 is defined in a portion of the core portion 111 disposed closer to the front end thereof than the connection pad portions 152, where the plug-side optical connection portion 161 is formed. The optical path conversion portion 161 is provided with a later-described slope surface 162 functioning as a minor surface and is capable of changing a direction of light transmitted from the optical waveguide to about a right angle. That is, the optical path conversion portion 161 changes an optical path extending in an axial direction of the cable 101 to an optical path extending in a direction perpendicular to the lower surface of the cable 101. Owing to this configuration, light transmitted through the optical waveguide can be emitted toward the lower side from the lower surface of the cable 101, and light incident onto the lower surface of the cable 101 from the lower side can be introduced to the optical waveguide. The optical path conversion portion 161 is formed at a position corresponding to the optical semiconductor device 72 received in the optical connection portion 16 of the connector housing 11 in a state where the cable 101 is connected to the receptacle connector 1.

The plug housing 130 includes a plug housing body 121 configured as a rectangular frame-like member extending in an axial direction of the cable 101 and a plug top plate 126 configured as a rectangular plate-like member extending in the axial direction of the cable 101. The plug housing body 121 is a member integrally formed with the plug top plate 126 of an insulating material such as synthetic resin and is provided with a pair of sidewall portions 124 extending in the long-axis direction, and a front crossbar portion 122 configured to connect front ends of the sidewall portions 124 with each other.

The front crossbar portion 122 functions as a plug-side guide portion of the plug 120, and is provided with a concave plug front end portion 132 and a first plug-side locking portion 132*a* which are engaged with the first connector-side locking portion 22. When the plug 120 is mounted on the connector housing 11, the front crossbar portion 122 is inserted into the concave front guide portion 14. Then, the first connector-side locking portion 22 comes into the concave plug front end portion 132 engaged with the first plug-side locking portion 132*a*.

Moreover, a first convex positioning portion 131*a* as a plug-side guide portion is formed on the rear end surface of the front crossbar portion 122 so as to be engaged not only with a cable-side front concave portion 102*d* which is formed in the front end surface 102*b* of the connection end portion 102 of the cable 101, but also with the first concave positioning portion 14*b* of the concave front guide portion 14. In the example illustrated in the drawing figures, the first convex positioning portion 131*a* is a columnar member having a semi-circular shape that protrudes rearwardly from a top plan view thereof. However, the top view shape thereof is not necessarily the semi-circular shape, but may be any shape as long as it protrudes rearwardly and has such a shape as to be inserted into and engaged with the cable-side front concave portion 102*d* and the first concave positioning portion 14*b* to achieve the positioning. For example, the bottom view shape may be a trapezoidal or triangular shape. In the present embodiment, it will be described that the first convex positioning portion 131*a* is a columnar member having such a shape that includes at least a circular arc-shaped portion from a top plan view thereof.

Moreover, cable-side front concave portions 102*d* have a rearwardly depressed shape are formed in the front end surface 102*b* of the connection end portion 102 of the cable 101. The cable-side front concave portions 102*d* are concave portions formed by excising a portion of the flat plate-like cable 101, and in which portions thereof close to the front end surface 102*b* are open and portions thereof close to the rear end are closed. Moreover, the cable-side front concave portions 102*d* are cable-side guide portions, and, as described above, are configured engage the first convex positioning portions 131*a* of the plug housing 130, thereby functioning as the cable-side guide portion for achieving the positioning of the cable 101 relative to the plug housing 130. For this purpose, at least a portion of each of the side walls of the cable-side front concave portions 102*d*, corresponding to the closed innermost portion has a circular arc shape which corresponds to the circular arc-like side view shape of the first convex positioning portions 131*a*, from a side view thereof. That is to say, the cable-side front concave portions 102*d* are concave portions having such a shape that includes at least a circular arc-shaped portion from a top plan view thereof. The top view shape of portions of the side walls of the cable-side front concave portions 102*d* corresponding to the innermost portion is not necessarily the circular arc shape, but may be any shape as long as it has such a shape as to be engaged with the first convex positioning portions 131*a*. For example, the top view shape may be a triangular shape or generally a V shape that includes two oblique side portions being inclined in mutually opposite directions to the longitudinal direction of the cable-side front concave portions 102*d*.

Furthermore, second convex positioning portions 131*b* as plug-side guide portions are formed in the inner side surfaces of the left and right side wall portions 124 so as to be engaged not only with the cable-side laterally concave portions 102*c* as cable-side guide portions which are formed to be laterally depressed from the side surfaces 102*a* of the cable 101, but also with the second concave positioning portions 35*b* of the concave rear guide portion 35*a*. In the example illustrated in the drawing figures, the second convex positioning portions 131*b* are columnar members having a circular shape from a top plan view thereof, and half of the top view shape protrudes inwardly from each of the side wall portions 124. The top view shape of the second convex positioning portions 131*b* is not necessarily the circular shape, but may be any shape as long as it has such a shape that at least a portion thereof protrudes inwardly and is inserted and engaged with the cable-side laterally concave portion 102*c* and the second concave positioning portion 35*b*. For example, the top view shape may be a trapezoidal or triangular shape. In the present embodiment, it will be described that the second convex positioning portion 131*b* is a columnar member having such a shape that includes at least a circular arc-shaped portion from a top plan view thereof.

Moreover, cable-side laterally concave portions 102*c* are formed on both side surfaces 102*a* of the connection end portion 102 of the cable 101 so as to be depressed toward the center in the width direction of the cable 101. The cable-side laterally concave portions 102*c* are concave portions which are formed by excising a portion of the flat plate-like cable 101, and in which portions thereof near to the side faces 102*a* are open and portions thereof near to the center in the width direction of the cable 101 are closed. Moreover, the cable-side laterally concave portions 102*c* are cable-side guide portions, and as described above, are configured to be engaged with the convex guide portions 131*b* of the plug housing 130, thereby functioning as a positioning guide portion for achieving positioning of the cable 101 relative to the plug housing 130. For this purpose, at least a portion of each of the side walls of the cable-side laterally concave portions 102*c*, corresponding to the closed innermost portion has a circular arc shape which corresponds to a circular arc shape of the second convex positioning portions 131*b*, from a side view thereof. That is to say, the cable-side laterally concave portions 102*c* are concave portions having such a shape that includes at least a circular arc-like portion, from a top plan view thereof. The top view shape of portions of the side walls of the cable-side laterally concave portions 102*c* corresponding to the innermost portion is not necessarily the circular arc shape, but may be any shape as long as it has such a shape as to be engaged with the second convex positioning portions 131*b*. For example, the top view shape may be a triangular shape or generally a V shape that includes two oblique side portions being inclined in mutually opposite directions to the longitudinal direction of the cable-side laterally concave portions 102*c*.

The thickness dimension of the side wall portions 124 is equal to the thickness dimension of the connection end portion 102 of the cable 101. Moreover, the front crossbar portion 122, the first convex positioning portions 131a, and the second convex positioning portions 131b are configured to protrude downward from at least the lower surfaces of the side wall portions 124. That is to say, as illustrated in FIG. 2D, in a state where the plug housing 130 is attached to the connection end portion 102 of the cable 101, the front crossbar portion 122, the first convex positioning portions 131a and the second convex positioning portions 131b protrude downward from the lower surface of the connection end portion 102.

Moreover, when the cable-side front concave portions 102d and the cable-side laterally concave portions 102c are inserted into and engaged with the first convex positioning portions 131a and the second convex positioning portions 131b, respectively, the positioning in the width direction of the connection end portion 102 of the cable 101 relative to the plug housing 130 and the positioning in the longitudinal direction (axial direction) of the cable 101 relative to the plug housing 130 are achieved, respectively. The connection end portion 102 is preferably fixed to the plug housing 130, and in this case, the connection end portion 102 may be fixedly secured to the plug housing 130 by securing means such as adhesive and may be integrated with the plug housing 130 by methods such as over-molding.

The base portion 144 of the locking plate 141 is attached to the plug housing 130. In the example illustrated in the drawing figures, the base portion 144 has a body thereof having an approximately rectangular shape and is provided with rear-attachment leg portions 144a configured to protrude laterally outward from the rear end of the body and front-attachment leg portions 144b configured to protrude laterally outward from the front end of the body. The connection end portion 102 of the cable 101 is attached to the plug housing 130 so that an upper surface thereof makes abutting contact with the lower surface of the base portion 144. That is to say, the base portion 144 is positioned in a state of being sandwiched between the plug top plate 126 and the connection end portion 102 of the cable 101. The base portion 144 may be fixedly secured to the plug housing 130 by securing means such as adhesive and may be integrated with the plug housing 130 by methods such as over-molding.

As illustrated in FIGS. 3A and 3B, in a state where the manipulation portion 142d is not operated by the operator, the convex locking portions 142c are in a state of protruding more than the side surfaces of the cable 101. The portions of the locking plate 141 other than the convex locking portions 142c preferably do not protrude more than the side surfaces of the cable 101 in order to achieve miniaturization of the plug 120. Moreover, as illustrated in FIGS. 3C and 3D, in a state where the operator operates manipulation portion 142d to deform elastically the left and right actuator arms 142b, thus narrowing the distance between them, the convex locking portions 142c preferably do not protrude more than the side surfaces of the cable 101.

Furthermore, as illustrated in FIGS. 2C and 2D, in a state where the plug housing 130 is attached to the connection end portion 102 of the cable 101, the rear end of the plug housing 130 is positioned at a further rear side rather than the optical path conversion portion 161 and at a further front side rather than the plug-side electrical connection portion 153. That is to say, the optical path conversion portion 161 is fixed to the plug housing 130, and the plug-side electrical connection portion 153 is not fixed to the plug housing 130. More specifically, the optical path conversion portion 161 is positioned between the first convex positioning portion 131a and the second convex positioning portion 131b in the axial direction of the cable 101. The upper surface of the cable 101 corresponding to the optical path conversion portion 161 is supported by making abutting contact with the plug top plate 126. On the contrary, the upper surface of the cable 101 corresponding to the optical path conversion portion 161 is in abutting or close contact with the actuation portion 142 of the locking plate 141 but is not supported.

Therefore, in the formed plug 120 in which the plug housing 130 is attached to the connection end portion 102 of the cable 101, the portion which is included in the plug-side optical connection portion 163 and corresponds to the optical path conversion portion 161 has rigidity and is made solid. On the contrary, the portion of the cable 101 corresponding to the plug-side electrical connection portion 153 has flexibility and is made flexible. Therefore, since the portion of the plug 120 corresponding to the optical path conversion portion 161 is made solid, it is possible to perform the positioning relative to the connector housing 11 in an accurate and easy manner. Moreover, since the portion of the plug 120 corresponding to the plug-side electrical connection portion 153 is made flexible, it is possible to absorb the errors of the lock mechanism to lock certainly the plug 120 and the connector housing 11.

First, as illustrated in FIG. 5A, the plug 120 is positioned above the connector housing 11. In this case, the lower surface of the plug 120; that is, the exposed surface of the connection pad portions 152, opposes the upper surface of the connector housing 11. At the same time, the front crossbar portion 122 which is disposed at the front end of the plug housing 130 is moved obliquely downward so as to be inserted into the rear end of the concave front guide portion 14.

Figure 4A:
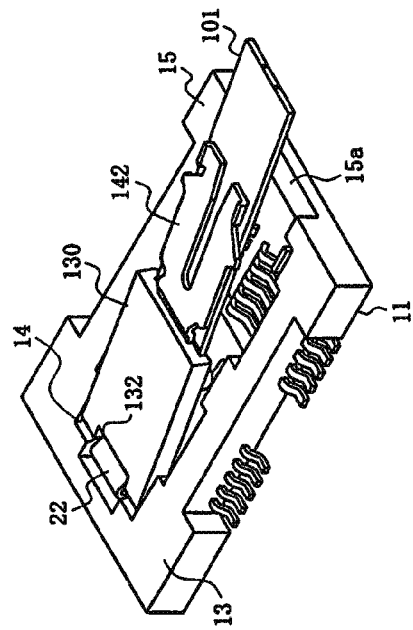

Subsequently, the plug 120 is moved so that the front crossbar portion 122 of the plug housing 130 is moved obliquely downward further, and as illustrated in FIGS. 4A and 5B, the convex engagement portion 22a of the first connector-side locking portion 22 is relatively inserted into the concave plug front end portion 132 to be engaged with the first plug-side locking portion 132a. In this way, the front crossbar portion 122 of the plug housing 130 is guided by the concave front guide portion 14, and the concave plug front end portion 132 is guided by the first connector-side locking portion 22, whereby the rough positioning in the width direction of the connector housing 11 and the plug 120 is carried out.

Figure 4B:
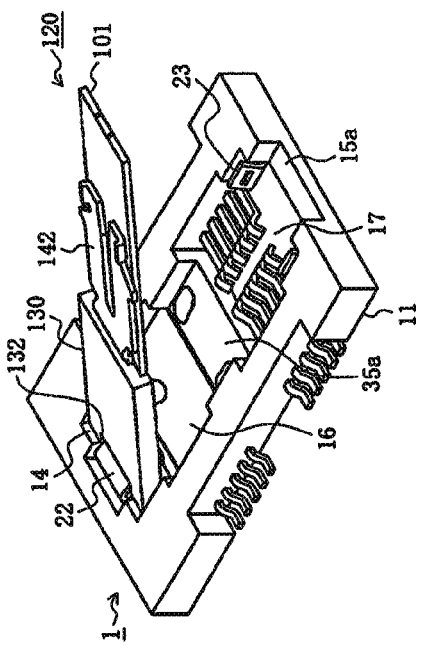

Subsequently, the plug housing 130 is continuously pressed frontward so that the plug 120 is rotated clockwise about the first plug-side locking portion 132a while maintaining the engagement state between the first plug-side locking portion 132a and the convex engagement portion 22a of the first connector-side locking portion 22, whereby the rear end of the plug 120 is lowered to come close to the connector housing 11, as illustrated in FIGS. 4B and 5C.

Figure 4C:
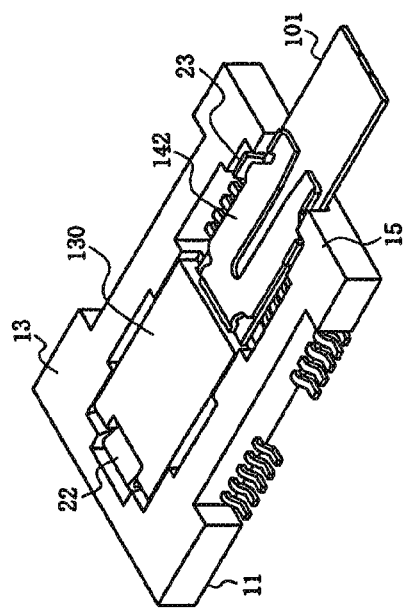
Figure 4D:
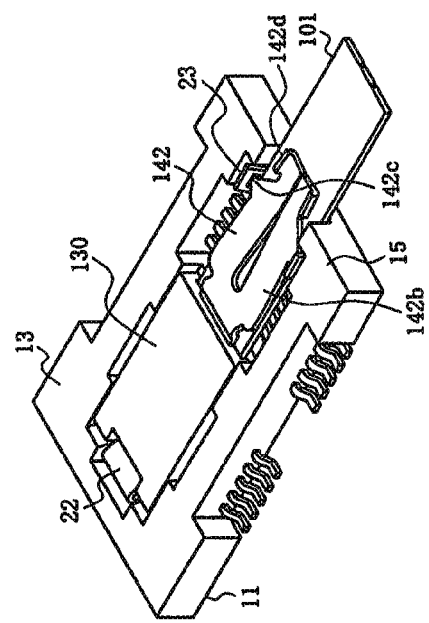

Subsequently, the plug 120 is rotated further and the rear end of the plug 120 is lowered further so that, as illustrated in FIGS. 4C-D and 5D, the rear end portion of the plug housing 130 is received in the concave rear guide portion 35a and the cable 101 is accommodated in the cable accommodation-concave portion 15a. In this way, the optical path conversion portion 161 is positioned so as to oppose the optical connection portion 16 of the receptacle connector 1, and the plug-side electrical connection portion 153 is positioned so as to oppose the electrical connection portion 17 of the receptacle connector 1. Moreover, the first convex positioning portion 131a of the plug housing 130 is engaged with the first concave positioning portion 14b of the connector housing 11, and the second convex positioning portion 131b of the plug housing 130 is engaged with the second concave positioning portion 35b of the connector housing 11.

At this time, the operator squeezes the left and right manipulation portions 142d with the fingers, thus displacing the left and right actuator arms 142b to narrow the distance between them, as illustrated in FIG. 4C. When the convex locking portions 142c are lowered so that the height position thereof reaches the height position of the concave locking portions 23a of the second connector-side locking portions 23, the operator releases the fingers from the left and right manipulation portions 142d. Then, the left and right actuator arms 142b return to their original position by the restoring properties thereof so as to increase the distance between them, whereby the left and right convex locking portions 142c are inserted into and engaged with the concave locking portions 23a of the second connector-side locking portions 23.

In this way, the convex locking portions 142c are held by the concave locking portions 23a in a state of being immovable in a direction, namely the vertical direction, perpendicular to the bottom surface of the connector housing 11. The concave locking portions 23a have a front-rear dimension thereof larger than that of the convex locking portions 142c and are formed so as to allow the convex locking portions 142c to be displaced in the front-rear direction, namely the axial direction of the cable 101. In this way, the convex locking portions 142c of the locking plate 141 are locked at the second connector-side locking portions 23.

The opposing surfaces of the left and right second connector-side locking portions 23, having formed therein the concave locking portions 23a may be configured as tapered surfaces so that the distance between the upper ends thereof is larger than the distance between the lower ends thereof. In such a case, even when the operator squeezes the left and right manipulation portions 142d so that the left and right actuator arms 142b are not severely displaced, by lowering the convex locking portions 142c along the surfaces of the second connector-side locking portions 23, the distance between the left and right actuator arms 142b can be narrowed, as illustrated in FIG. 4C. Therefore, it is possible to facilitate the operation of locking the convex locking portions 142c and the second connector-side locking portions 23.

As illustrated in FIG. 5D, the first plug-side locking portion 132a and the convex engagement portion 22a of the first connector-side locking portion 22 are maintained at their engagement state. Specifically, the first plug-side locking portion 132a which is a convex portion is pressed against and received below the convex engagement portion 22a of the first connector-side locking portion 22 having elastic properties, and an engagement surface 132c at the upper end of the first plug-side locking portion 132a is in tight contact with and engaged with the lower surface of the convex engagement portion 22a. Therefore, the first plug-side locking portion 132a is locked in a state of being pressed toward an obliquely rear lower side by the spring force exerted by the first connector-side locking portion 22. As a result, the front end of the plug 120 is locked at the connector housing 11.

As illustrated in FIG. 5D, the first plug-side locking portion 132a, which protrudes from the front end of the plug housing 130 and is not upwardly supported by the connector housing 11, receives a downward force by the spring force exerted by the first connector-side locking portion 22. Therefore, a rotation that causes the first plug-side locking portion 132a to be displaced downward, namely a counterclockwise movement in FIG. 5D, is applied to the plug 120. Thus, although the actuator arms 142b receive a force in a direction where the actuator arms 142b are displaced upwardly, since the distal ends thereof are engaged with the concave locking portions 23a of the second connector-side locking portions 23, they will not be displaced upwardly. On the contrary, since as a reaction, the actuator arms 142b receive a force, namely a downward force, in a direction from the concave locking portions 23a to the bottom surface of the connector housing 11, the locking plate 141 generally exerts a force that downwardly presses the cable 101, whereby the cable 101 is securely connected to the receptacle connector 1.

In this way, when the plug 120 is positioned relative to the connector housing 11 so that their relative positions are fixed, the plug 120 is engaged with and locked at the receptacle connector 1, whereby the cable 101 is securely connected to the receptacle connector 1. When the engagement between the cable 101 and the receptacle connector 1 is released, an operation the reverse of the above-described operation is performed.

As described above, when the cable 101 is connected to the receptacle connector 1, the operator frontwardly presses the plug housing 130 continuously so that the engagement state between the first plug-side locking portion 132a and the convex engagement portion 22a of the first connector-side locking portion 22 is maintained. Therefore, immediately after the plug 120 is positioned at such a state as illustrated in FIGS. 4D and 5D, the positioning of the plug 120 and the connector housing 11 is not yet completed, but the plug 120 and the connector housing 11 are positioned in such a state as illustrated in FIGS. 6A and 6C.

That is to say, the front crossbar portion 122 of the plug 120 is inserted into and engaged with the concave front guide portion 14 of the connector housing 11, and the first convex positioning portion 131a of the front crossbar portion 122 is inserted into and engaged with the first concave positioning portion 14b of the concave front guide portion 14. However, the first convex positioning portion 131a and the first concave positioning portion 14b are not in abutting or interfering contact with each other. Therefore, the positioning in the axial and width directions of the plug 120 by the first convex positioning portion 131a and the first concave positioning portion 14b is not yet completed.

In the figures, the first concave positioning portion 14b is a concave portion having a semi-circular shape that is depressed rearwardly from a top plan view thereof. However, the top view shape thereof is not necessarily the semi-circular shape, but may be any shape as long as it is depressed rearwardly and has such a shape as to be inserted into and engaged with the first convex positioning portion 131a to achieve the positioning. For example, the top view shape may be a trapezoidal or triangular shape. In the present embodiment, it will be described that the first concave positioning portion 14b is a concave portion having such a shape that includes at least a circular arc-shaped portion from a top plan view thereof.

Moreover, the second convex positioning portion 131b is inserted into and engaged with the second concave positioning portion 35b that is opened to the bottom surface of the concave rear guide portion 35a of the connector housing 11. However, the positioning in the width direction of the plug 120 by the second convex positioning portion 131b and the second concave positioning portion 35b is not yet completed. In the present embodiment, as illustrated in the drawing figures, the second concave positioning portion 35b has a generally rectangular or elliptical shape that is long in the axial direction of the plug 120, from a top plan view thereof, and is configured to include a large-width portion 35b1 disposed at the vicinity of a front end thereof and a small-width portion 35b2 disposed at the vicinity of a rear end thereof.

As illustrated in FIGS. 6A and 6C, since the second convex positioning portion 131b is positioned within the large-width portion 35b1 and thus does not interfere with the second concave positioning portion 35b, the positioning in the width direction of the plug 120 by the second convex positioning portion 131b and the second concave positioning portion 35b is not yet completed. However, since the front crossbar portion 122 is pressed rearwardly by the spring force exerted by the first connector-side locking portion 22, when the operator stops the operation of frontwardly pressing the plug housing 130, the plug 120 is displaced rearward relative to the connector housing 11 by the spring force. Therefore, as illustrated in FIGS. 6B and 6D, the positioning of the plug 120 and the connector housing 11 is completed.

That is to say, by the spring force, the first convex positioning portion 131a is displaced rearward to be press-fitted into the first concave positioning portion 14b, and the side surfaces of the first convex positioning portion 131a and the side surfaces of the first concave positioning portion 14b are pressed against each other to interfere with each other, whereby the positions of the first convex positioning portion 131a and the first concave positioning portion 14b are fixed relative to each other in the axial and width directions of the plug 120. In this way, the positions of the plug 120 and the connector housing 11 are fixed relative to each other in the axial and width directions of the plug 120.

Moreover, by the spring force, the second convex positioning portion 131b is displaced rearward to be positioned within the small-width portion 35b2. Therefore, the side surfaces of the second convex positioning portion 131b interfere with the small-width portion 35b2, the positions of the second convex positioning portion 131b and the second concave positioning portion 35b are fixed relative to each other in the width direction of the plug 120. In this way, the positions of the plug 120 and the connector housing 11 are fixed relative to each other in the width direction of the plug 120.

Figure 7:
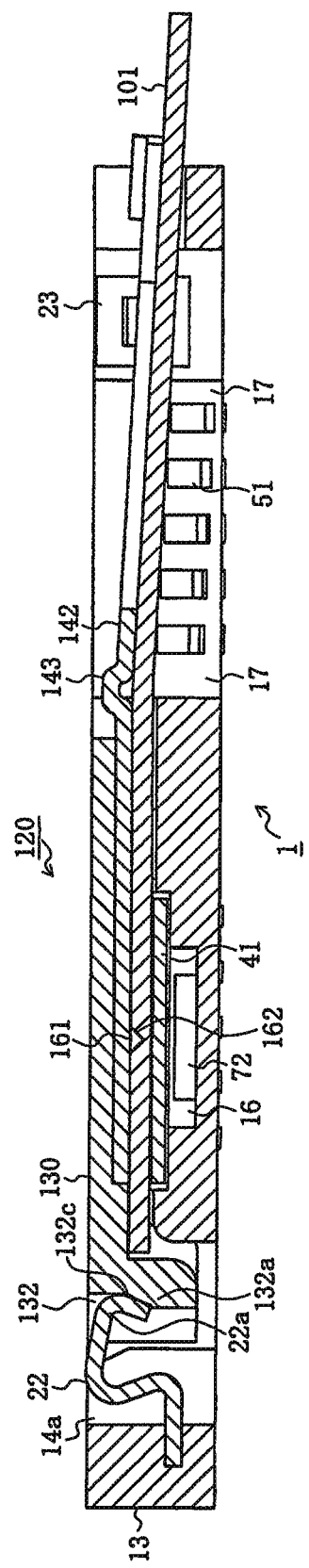
FIG. 7 is a schematic side sectional view illustrating the connection relationship between a connection end portion of the cable and an optical connection portion and an electrical connection portion of the receptacle connector.
Figure 8:
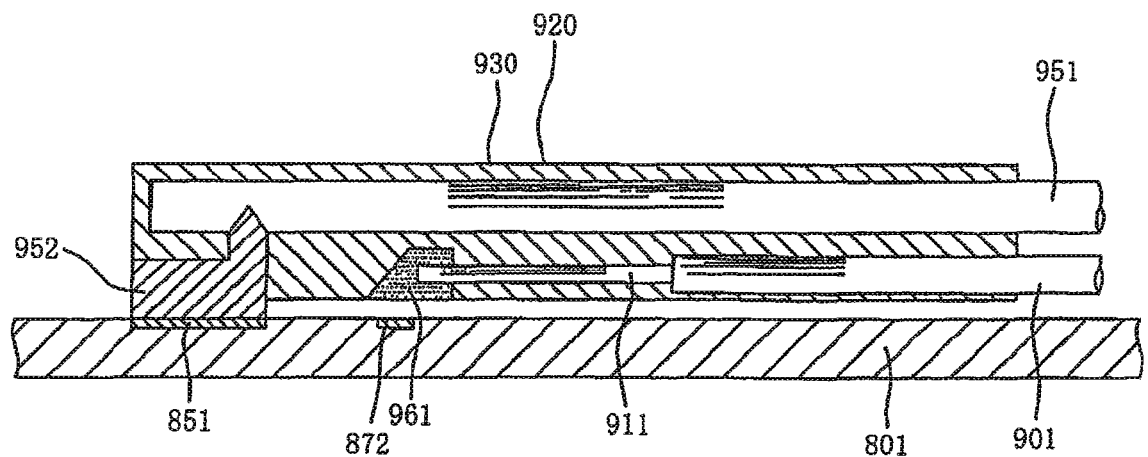
FIG. 8 is a sectional view of a conventional connector.

In a state where the plug 120 is positioned relative to the connector housing 11, the plug-side optical connection portion 163 and the optical path conversion portion 161 are positioned right above the optical semiconductor device 72 received in the optical connection portion 16 of the receptacle connector 1, as illustrated in FIG. 7. Moreover, with respect to the width direction of the cable 101, the plug-side optical connection portion 163 and the optical path conversion portion 161 are positioned right above the optical semiconductor device 72. In this way, the cable 101 and the receptacle connector 1 are optically connected with each other.

That is to say, light emitted from a light emitting surface of the optical semiconductor device 72 is incident to the cable 101 from the lower side thereof, reflected from the slope surface 162 disposed close to the rear side of the optical path conversion portion 161, introduced to the corresponding core portion 111 while changing a traveling direction thereof to about a right angle, and transmitted through the core portion 111 along the axial direction of the cable 101. On the other hand, light transmitted through the core portion 111 along the axial direction of the cable 101 is reflected from the slope surface 162 disposed close to the rear side of the optical path conversion portion 161, emitted toward the lower side from the lower surface of the cable 101 while changing a traveling direction thereof to about a right angle, and received by a light receiving surface of the optical semiconductor device 72.

In addition, the plug-side electrical connection portion 153 of the plug 120 is disposed at a position right above the electrical connection portion 17 of the receptacle connector 1, and the respective connection pad portions 152 are brought into electrical contact with the contact portions of the corresponding ones of the electrical connection terminals 51 received in the electrical connection portion 17. However, in the present embodiment, the bottom surface of the cable accommodation-concave portion 15a of the connector housing 11 is formed at a position lower than the sealing plate 41 of the optical connection portion 16. Therefore, as illustrated in FIG. 7, it may be preferable that the position of the upper surface of the sealing plate 41 of the optical connection portion 16, as an optical lock position at which the optical path conversion portion 161 included in the plug-side optical connection portion 163 is locked, is set to be lower than the position of the convex locking portions 142c of the locking plate 141, as an electrical lock position at which the plug-side electrical connection portion 153 is locked. It should be noted that the height difference between the optical lock position and the electrical lock position is drawn out of proportion in FIG. 7.

As described above, the position of the convex locking portions 142c is lower than the position of the upper surface of the sealing plate 41 of the optical connection portion 16, namely close to the bottom surface of the connector housing 11. In such a case, the portion of the plug 120 disposed right above the optical connection portion 16 of the receptacle connector 1 receives a downward force at a front end thereof by the spring force exerted by the first connector-side locking portion 22, as described above, while receiving a downward force at a rear end thereof from the convex locking portions 142c via the locking plate 141. Therefore, the portion of the plug 120 disposed above the optical connection portion 16 of the receptacle connector 1 is pressed against the optical connection portion 16. When an external force is applied to the cable 101, for example, due to shaking of the rear portion of the cable 101, the optical connection state between the optical path conversion portion 161 and the optical semiconductor device 72 can be maintained stably, and thus no optical transmission loss will occur.

On the contrary, if the position of the convex locking portions 142c of the locking plate 141 is higher than the position of the engagement surface 132c of the first plug-side locking portion 132a, when an external force is applied to the cable 101, for example, due to shaking of the rear portion of the cable 101, the optical connection state between the optical path conversion portion 161 and the optical semiconductor device 72 will become unstable due to reasons such as distance, skew, or deformation, and thus an optical transmission loss will occur. Although the portion of the plug 120 disposed right above the electrical connection portion 17 of the receptacle connector 1 is sloped to some extent as illustrated in FIG. 7, since the electrical connection terminals 51 have elastic properties, the contact portions of the electrical connection terminals 51 will be elastically displaced vertically to be able to maintain their contacts with the connection pad portions 152.

Since the locking plate 141 is generally formed of an elastically deformable material, and the actuation portion 142 is connected to the base portion 144 via the curved portion 143 configured to protrude upwardly, the actuation portion 142 disposed right above the electrical connection portion 17 can be freely inclined with respect to the plug housing 130 having the base portion 144 attached thereto. Although the actuation portion 142 is formed in an approximately straight-line shape, from a side view thereof to be inclined, the actuation portion 142 may have any shape as long as it is able to apply a pressing force towards the electrical connection terminals 51. For example, the side view shape may be curved or rectangular.

When the locking plate 141 is formed of a conductive material, the second connector-side locking portions 23 configured to be engaged with the convex locking portions 142c are also formed of a conductive material, and a portion of each of the second connector-side locking portions 23 is connected to a ground line of a board mounting thereon the receptacle connector 1. By doing so, it is possible effectively to shield the plug 120 from electromagnetic waves.

As described above, the hybrid connector according to the present embodiment includes the cable 101 having formed therein the optical waveguide and the conductive wires 151; the plug 120 having the cable 101 connected thereto; and the connector housing 11 configured to mount thereon the plug 120. The connector housing 11 is provided with the connector-side locking portion, the optical connection portion 16, and the electrical connection portion 17. The plug 120 is provided with the plug-side locking portion, the plug-side optical connection portion 163, and the plug-side electrical connection portion 153, and the plug-side optical connection portion 163 has a higher rigidity than the plug-side electrical connection portion 153. When the plug-side locking portion is engaged with the connector-side locking portion so that the plug 120 is mounted on the connector housing 11, the plug-side optical connection portion 163 and the plug-side electrical connection portion 153 oppose the optical connection portion 16 and the electrical connection portion 17, respectively.

Due to such a configuration, the errors of the lock mechanism can be absorbed, and the positioning of the plug 120 relative to the connector housing 11 can be achieved in an accurate and easy manner. Moreover, it is possible to simplify the structure of the lock mechanism, thus simplifying the overall structure of the hybrid connector and decrease the manufacturing cost thereof. Furthermore, it is possible to miniaturize the overall size, to improve durability thereof, and to facilitate the operability thereof.

Moreover, the connector-side locking portion includes the first connector-side locking portion 22, which is arranged close to the optical connection portion 16, and the second connector-side locking portion 23, which is arranged close to the electrical connection portion 17. The plug-side locking portion includes the first plug-side locking portion 132a, which is arranged close to the plug-side optical connection portion 163, and the convex locking portion 142c as the second plug-side locking portion, which is arranged close to the plug-side electrical connection portion 153. When the first connector-side locking portion 22 and the first plug-side locking portion 132a are engaged together, and the second connector-side locking portion 23 and the convex locking portion 142c are engaged together, the connector housing 11 and the plug 120 are locked. Due to such a configuration, it is possible to achieve the locking of the connector housing 11 and the plug 120 in an accurate and easy manner. Moreover, it is possible to maintain the connection between the optical connection portion 16 and the plug-side optical connection portion 163 and the connection between the electrical connection portion 17 and the plug-side electrical connection portion 153 with high precision and certainty.

Furthermore, the plug 120 is provided with the plug housing 130 which has formed therein the first plug-side locking portion 132a, and the locking plate 141 which is configured to be capable of being elastically deformed and attached to the plug housing 130 and which has formed therein the convex locking portion 142c. The plug-side optical connection portion 163 is included in a portion of the cable 101, which is fixed in a state of being positioned relative to the plug housing 130. The plug-side electrical connection portion 153 is included in a portion of the cable 101, which opposes the locking plate 141. Due to such a configuration, since the plug-side optical connection portion 163 has a high rigidity and solid, the positioning relative to the optical connection portion 16 can be performed accurately, and occurrence of an optical transmission loss can be prevented. Moreover, since the plug-side electrical connection portion 153 has flexibility and is flexible, the errors of the lock mechanism can be absorbed effectively while maintaining certainly the electrical connection state with the electrical connection portion 17.

Furthermore, the first connector-side locking portion 22 is configured to press the first plug-side locking portion 132a in a direction towards the bottom surface of the connector housing 11, and the second connector-side locking portion 23 is configured to hold the convex locking portion 142c in a direction perpendicular to the bottom surface of the connector housing 11. Due to such a configuration, the cable 101 is pressed in a direction towards the bottom surface of the connector housing 11 and is thus securely connected to the receptacle connector 1. Moreover, the connection state between the plug-side optical connection portion 163 and the optical connection portion 16 and the connection state between the plug-side electrical connection portion 153 and the electrical connection portion 17 can be maintained stably.

Furthermore, the position at which the second connector-side locking portion 23 and the convex locking portion 142c are engaged is located closer to the bottom surface of the connector housing 11 than the position of the upper surface of the optical connection portion 16. Due to such a configuration, even when an unexpected external force is applied to the cable 101, it is possible to maintain a stable connection between the plug-side optical connection portion 163 and the optical connection portion 16, preventing the occurrence of an optical transmission loss.

Furthermore, the cable 101 is provided with the cable-side guide portion, the plug housing 130 is provided with the plug-side guide portion, the connector housing 11 is provided with the connector-side guide portion, and the plug-side guide portion is configured to be engaged with the cable-side guide portion to achieve the positioning of the cable 101 and the plug housing 130 and be engaged with the connector-side guide portion to achieve the positioning of the connector housing 11 and the plug 120. Due to such a configuration, it is possible to reduce cumulative errors which result from various errors, such as, the dimensional errors of the guide members and the assembly errors of respective members such as the cable 101, the plug housing 130, or the connector housing 11. As a result, it is possible to improve the precision of the operation of positioning the cable 101 relative to the connector housing 11.

While a preferred embodiment of the Present Application is shown and described, it is envisioned that those skilled in the art may devise various modifications without departing from the spirit and scope of the foregoing Description and the appended Claims.

What is claimed is:

1. A hybrid connector, the hybrid connector comprising:
   a cable, the cable including an optical waveguide and conductive wires disposed therein;
   a plug, the plug being connected to the cable, the plug including a plug-side locking portion, a plug-side optical connection portion and a plug-side electrical connection portion, the plug-side optical connection portion having a higher rigidity than the plug-side electrical connection portion; and
   a connector housing, the connector housing being configured to mount on the plug, the connector housing including a connector-side locking portion, a connector-side optical connection portion and a connector-side electrical connection portion.

2. The hybrid connector of claim 1, wherein when the plug-side locking portion engages the connector-side locking portion so that the plug is mounted on the connector housing, the plug-side optical connection portion and the plug-side electrical connection portion oppose the optical connection portion and the electrical connection portion, respectively.

3. The hybrid connector of claim 2, wherein the connector-side locking portion includes a first connector-side locking portion, arranged close to the optical connection portion, and a second connector-side locking portion, arranged close to the electrical connection portion.

4. The hybrid connector of claim 3, wherein the plug-side locking portion includes a first plug-side locking portion, arranged close to the plug-side optical connection portion, and a second plug-side locking portion, arranged close to the plug-side electrical connection portion.

5. The hybrid connector of claim 4, wherein when the first connector-side locking portion and the first plug-side locking portion are engaged together, and the second connector-side locking portion and the second plug-side locking portion are engaged together, the connector housing and the plug are locked.

6. The hybrid connector of claim 5, wherein the plug is provided with a plug housing having formed therein the first plug-side locking portion, and a locking plate capable of being elastically deformed and attached to the plug housing having formed therein the second plug-side locking portion.

7. The hybrid connector of claim 6, wherein the plug-side optical connection portion is included in a portion of the cable fixed in a state of being positioned relative to the plug housing.

8. The hybrid connector of claim 7, wherein the plug-side electrical connection portion is included in a portion of the cable opposing the locking plate.

9. The hybrid connector of claim 8, wherein the cable includes a cable-side guide portion.

10. The hybrid connector of claim 9, wherein the plug housing includes a plug-side guide portion.

11. The hybrid connector of claim 10, wherein the connector housing includes a connector-side guide portion.

12. The hybrid connector of claim 11, wherein the plug-side guide portion engages the cable-side guide portion to achieve a positioning of the cable and the plug housing and engages the connector-side guide portion to achieve a positioning of the connector housing and the plug.

13. The hybrid connector of claim 2, wherein two or more plug-side locking portions are provided, at least one is plug-side locking portion being formed on each of a front end and a rear end of the plug housing.

14. The hybrid connector of claim 2, wherein two or more connector-side locking portions are provided, at least one is connector-side locking portion being formed on each of a front end and a rear end of the connector housing.

15. The hybrid connector of claim 5, wherein the position at which the second connector-side locking portion and the second plug-side locking portion are engaged together is located closer to the bottom surface of the connector housing than the position of an upper surface of the optical connection portion.

16. The hybrid connector of claim 5, wherein the first connector-side locking portion presses the first plug-side locking portion towards a bottom surface of the connector housing.

17. The hybrid connector of claim 16, wherein the position at which the second connector-side locking portion and the second plug-side locking portion are engaged together is located closer to the bottom surface of the connector housing than the position of an upper surface of the optical connection portion.

18. The hybrid connector of claim 8, wherein the position at which the second connector-side locking portion and the second plug-side locking portion are engaged together is located closer to the bottom surface of the connector housing than the position of an upper surface of the optical connection portion.

19. The hybrid connector of claim 8, wherein the second connector-side locking portion holds the second plug-side locking portion perpendicular to the bottom surface of the connector housing.

20. The hybrid connector of claim 19, wherein the position at which the second connector-side locking portion and the second plug-side locking portion are engaged together is located closer to the bottom surface of the connector housing than the position of an upper surface of the optical connection portion.

* * * * *